US009925681B2

(12) United States Patent
Lemaire

(10) Patent No.: US 9,925,681 B2
(45) Date of Patent: Mar. 27, 2018

(54) METHOD AND MACHINE FOR ETCHING OPTICAL LENSES

(71) Applicant: ESSILOR INTERNATIONAL (COMPAGNIE GENERALE D'OPTIQUE), Charenton-le-Pont (FR)

(72) Inventor: Cedric Lemaire, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 25 days.

(21) Appl. No.: 14/908,001

(22) PCT Filed: Jun. 26, 2014

(86) PCT No.: PCT/FR2014/051635
§ 371 (c)(1),
(2) Date: Jan. 27, 2016

(87) PCT Pub. No.: WO2015/011356
PCT Pub. Date: Jan. 29, 2015

(65) Prior Publication Data
US 2016/0167246 A1 Jun. 16, 2016

(30) Foreign Application Priority Data
Jul. 26, 2013 (FR) ...................................... 13 57427

(51) Int. Cl.
B24B 9/14 (2006.01)
B26D 3/08 (2006.01)
(Continued)

(52) U.S. Cl.
CPC ................. B26D 3/08 (2013.01); B24B 9/14 (2013.01); B24B 13/046 (2013.01);
(Continued)

(58) Field of Classification Search
CPC ......... B28D 1/143; B23B 41/00; B23B 41/14; B23B 2215/40; B23B 2226/61;
(Continued)

(56) References Cited

U.S. PATENT DOCUMENTS 4,656,590 A * 4/1987 Ace .......................... B24B 9/146
351/159.8
6,336,057 B1 * 1/2002 Obayashi ................ B24B 9/148
451/43
(Continued)

FOREIGN PATENT DOCUMENTS

CA 2428199 A1 * 11/2004 ............... G02C 1/02
EP 1 864 753 A1 12/2007
(Continued)

OTHER PUBLICATIONS

International Search Report, dated Sep. 2, 2014, from corresponding PCT Application.

Primary Examiner — Daniel Howell
Assistant Examiner — Yasir Diab
(74) Attorney, Agent, or Firm — Young & Thompson

(57) ABSTRACT

A method for machining an optical lens via a trimming machine, includes: —a step of locking the optical lens, —a step of acquiring shape characteristics of the optical faces of the optical lens, —a step of generating an instruction for trimming the optical lens, and —a step of trimming the optical lens along a desired contour. The method also includes the following steps: —a step of generating an instruction for etching the optical lens depending on the acquired shape characteristics, and —a step of etching the optical lens along a line located inside the desired contour, during which a pointed etching tool of the trimming machine is controlled according to the etching instruction in such a way that the point of same continually slides against the optical face in order to score same along the line.

22 Claims, 4 Drawing Sheets

(51) Int. Cl.
*B24B 13/04* (2006.01)
*B24B 47/22* (2006.01)
*B28D 1/14* (2006.01)

(52) U.S. Cl.
CPC ........ *B24B 47/225* (2013.01); *B23B 2215/40* (2013.01); *B23C 2215/40* (2013.01); *B28D 1/143* (2013.01)

(58) Field of Classification Search
CPC .... B26D 3/08; B23C 3/12; B23C 3/28; B23C 2215/40; B23C 2226/61; B24B 9/14; B24B 47/225; Y10T 29/5107; Y10T 29/5146; Y10T 29/5168
See application file for complete search history.

(56) References Cited

U.S. PATENT DOCUMENTS

| | | | |
|---|---|---|---|
| 6,383,061 B1* | 5/2002 | Mandler | B24B 13/0031 451/42 |
| 6,568,990 B2* | 5/2003 | Siders | B24B 1/00 451/384 |
| 2006/0167758 A1* | 7/2006 | Yancy | G06Q 30/02 29/557 |
| 2006/0217036 A1* | 9/2006 | Meunier | B24B 27/0076 451/5 |
| 2007/0277357 A1 | 12/2007 | Meyer et al. | |
| 2008/0098584 A1 | 5/2008 | Meyer et al. | |
| 2009/0047081 A1* | 2/2009 | Nauche | B24B 13/005 408/89 |
| 2009/0068932 A1* | 3/2009 | Lemaire | B24B 9/148 451/43 |
| 2010/0009603 A1* | 1/2010 | Nauche | B24B 9/14 451/43 |
| 2010/0093265 A1 | 4/2010 | Lemaire et al. | |
| 2011/0141435 A1 | 6/2011 | Dubois et al. | |

FOREIGN PATENT DOCUMENTS

| | | |
|---|---|---|
| EP | 1 916 060 A1 | 4/2008 |
| EP | 2 306 236 A1 | 4/2011 |
| WO | 2007/141402 A1 | 12/2007 |
| WO | 2008/043910 A1 | 4/2008 |

* cited by examiner

METHOD AND MACHINE FOR ETCHING OPTICAL LENSES

TECHNICAL FIELD OF THE INVENTION

The present invention generally relates to the manufacture of optical lenses.

It relates more particularly to a method for machining an optical lens by way of a trimming machine, comprising:

a step of immobilizing said optical lens on immobilizing means of said trimming machine, a step of acquiring geometric characteristics relating to the shape of at least one of the optical faces of the optical lens, a step of defining trimming instructions for the optical lens as a function of the geometric characteristics acquired, and a step of trimming the optical lens around a desired outline, during which a trimming tool of the trimming machine is driven relative to said immobilizing means according to said trimming instructions.

The invention finds a particularly advantageous application in the production of decorative etchings (patterns such as stars, animals, etc.) or technical etchings (patterns such as the intended replacement date for the optical lens, the details of the owner of the spectacles, the serial number of the optical lens, etc.).

It also relates to a machine for trimming an optical lens, comprising:

means for immobilizing the optical lens, a first acquisition means for acquiring geometric characteristics relating to the shape of at least one of the optical faces of the optical lens immobilized in said immobilizing means, a second acquisition means for acquiring trimming instructions for the optical lens, a trimming tool suitable for trimming the optical lens, and a driving means suitable for driving said trimming tool relative to said immobilizing means according to said trimming instructions.

PRIOR ART

The process of manufacturing optical lenses, and especially corrective ophthalmic lenses, requires a particularly high level of care and precision. It generally comprises four main steps. Firstly, a semifinished lens, also known as a wafer blank or preform, is obtained by molding plastics or mineral material which has been chosen to form the base substrate of the lens. Secondly, the molded semifinished lens is surfaced on one and/or the other of its two optical faces in order to comply with the prescribed geometric model and correction. Thirdly, this finished lens receives various treatments, for example a hydrophobic treatment, an antiscratch treatment, an antireflective treatment, etc. Finally, fourthly, the lens is trimmed and finalized, so as to be able to be fixed to the selected spectacle frame.

On account of the high demands for precision, these operations are broken down into a plurality of substeps associated with the same number of specific work stations.

During the fourth operation, the trimming is thus carried out on a trimming machine separate from the machines used during the preceding operations.

This trimming can be preceded or followed by a step of etching the lens in order to inscribe particular markings thereon. For this purpose, use is generally made of a specific etching machine, separate from said trimming machine.

It is thus known to use a micropercussion machine or a machine that uses a laser to produce etchings on the edge or on one of the optical faces of the optical lens. Such a machine is very expensive, such that the production of such an etching generally has a high cost.

Moreover, only a specialized laboratory generally has such a machine, and so it is necessary to send the finished lens there, this extending the manufacturing times for the lens.

SUBJECT OF THE INVENTION

In order to remedy the abovementioned drawbacks of the prior art, the present invention proposes a novel method and a novel machine for producing such etchings at a lower cost, within a much shorter time.

More particularly, the invention proposes a method as defined in the introduction, in which the following are provided:

a step of defining etching instructions for said optical face of the optical lens as a function of the geometric characteristics acquired, and a step of etching said optical face of the optical lens along a line situated inside said desired outline, during which a sharp etching tool of said trimming machine is driven relative to said immobilizing means according to said etching instructions in such a way that its point slides continuously on said optical face in order to scratch it along said line.

Thus, by virtue of the invention, the etching tool is mounted directly on the trimming machine. The various mobilities that make it possible to drive this tool on the lens can then be obtained by using the preexisting mobilities of the trimming machine. The cost of etching the lens is then greatly reduced.

The use of the trimming machine for etching the lens also makes it possible to avoid a situation in which an optician has to send the lens to a specialized laboratory, thereby reducing the manufacturing time for the lens. Moreover, it provides the optician with greater latitude when he wishes to adapt or modify the pattern of the etching, since he can interact with the trimming machine in real time.

Further advantageous and nonlimiting features of the method according to the invention are as follows:

during the etching step, said etching tool is driven relative to said immobilizing means in such a way that it creates a scratch on said optical face, said scratch having a width and a depth of between 0.005 and 0.5 millimeter;

since said point has an axis of revolution, starting from the etching step, said etching tool is driven relative to said immobilizing means in such a way that said axis of revolution is positioned orthogonally to the plane which is tangential to said optical face and which passes through the initial point of contact between said point and said optical face;

since said point has an axis of revolution, during the etching step, said etching tool is driven relative to said immobilizing means in such a way that said axis of revolution remains overall orthogonal (to within 10 degrees) to the plane which is tangential to said optical face and which passes through the point of contact between said point and said optical face;

since said trimming machine has a chassis with respect to which said immobilizing means are mounted so as to pivot with a first pivoting mobility and with respect to which a finishing arm is mounted so as to pivot with two other pivoting mobilities, the finishing arm carrying said etching tool, during the etching step, said etching tool is kept fixed in terms of rotation with respect to said finishing arm;

since said etching tool is equipped with a strain gage suitable for measuring a stress relating to the force exerted by the etching tool on the optical lens, during the etching step, said stress is acquired and said etching tool is driven relative to said immobilizing means as a function of the stress acquired;

since said etching tool comprises a sheath in which a mount for said point is mounted so as to be able to move in translation, and also a return means for returning said mount into the position extended out of the sheath, during the etching step, said etching tool is driven relative to said immobilizing means in such a way that said point is pressed theoretically into the optical lens to a setpoint depth determined as a function at least of the material of the optical lens;

during the step of defining the etching instructions, provision is made of an operation of acquiring the shape and the position of at least one interference zone, this interference zone comprising at least the zone of contact between said optical face and said immobilizing means, and an operation of identifying, inside the desired outline, at least one suitable zone in which the line can be etched, taking the shape and the position of each interference zone into account;

during the step of defining the etching instructions, provision is made of an automatic operation of positioning said line inside said suitable zone;

during the step of defining the etching instructions, provision is made of a manual operation of positioning said line inside the desired outline;

since said optical face of the optical lens has a surface coating, said line is situated in a temporal or nasal zone of said optical face and forms a surface portion that is free of coating;

provision is made of a subsequent step of coloring the scratch obtained, during which a marker of said trimming machine is driven relative to said immobilizing means in such a way that it slides inside said scratch; and said line forms a tracking code for the optical lens.

The invention also proposes a trimming machine as defined in the introduction, wherein provision is made of an etching tool which comprises an abrasive point suitable for scoring said optical face of said optical lens, wherein said second acquisition means is intended to acquire etching instructions for said optical face of the optical lens, and wherein said driving means is intended to drive said etching tool relative to said immobilizing means according to said etching instructions in such a way that said point slides on said optical face in order to scratch it.

Further advantageous and nonlimiting features of the trimming machine according to the invention are as follows:

said etching tool comprises a nonabrasive mount, at the end of which said point is fixed, which is made of a different material than the material of said point, and said point extends along a length of less than 5 millimeters;

provision is made of a chassis with respect to which said immobilizing means are mounted so as to pivot with a first pivoting mobility and with respect to which a finishing arm is mounted so as to pivot with two other pivoting mobilities, and the finishing arm carries said etching tool;

the finishing arm carries at least one other tool chosen from the following list: a mini polishing wheel, a mini chamfering wheel, a milling cutter, a drill bit;

the mount for the etching tool is mounted on the finishing arm in a fixed manner in terms of rotation;

the finishing arm carries a rotary chuck for a drill bit and the mount for the etching tool has a gripping part mounted removably in said rotary chuck;

the first acquisition means comprises at least one sensor which is intended to come into contact with said optical face of the optical lens, which is mounted so as to move in translation with another translational mobility with respect to said chassis, and which carries a marker;

the first acquisition means comprises at least one sensor which is intended to come into contact with said optical face of the optical lens, which is mounted so as to move in translation with another translational mobility with respect to said chassis, and which carries said etching tool;

said etching tool is equipped with a strain gage suitable for measuring a stress relating to the force exerted by the etching tool on the optical lens;

the mount for the etching tool is mounted so as to be able to move in translation in a sheath, and provision is made of a return means for returning said mount into the position extended out of the sheath.

DETAILED DESCRIPTION OF AN EXEMPLARY EMBODIMENT

The description which follows with reference to the appended drawings, which are given by way of nonlimiting examples, will make it easy to understand the essence of the invention and how it can be achieved.

A recurrent operation during the manufacture of optical lenses consists in etching patterns on these lenses. These may be esthetic patterns or technical patterns.

Figure 1:
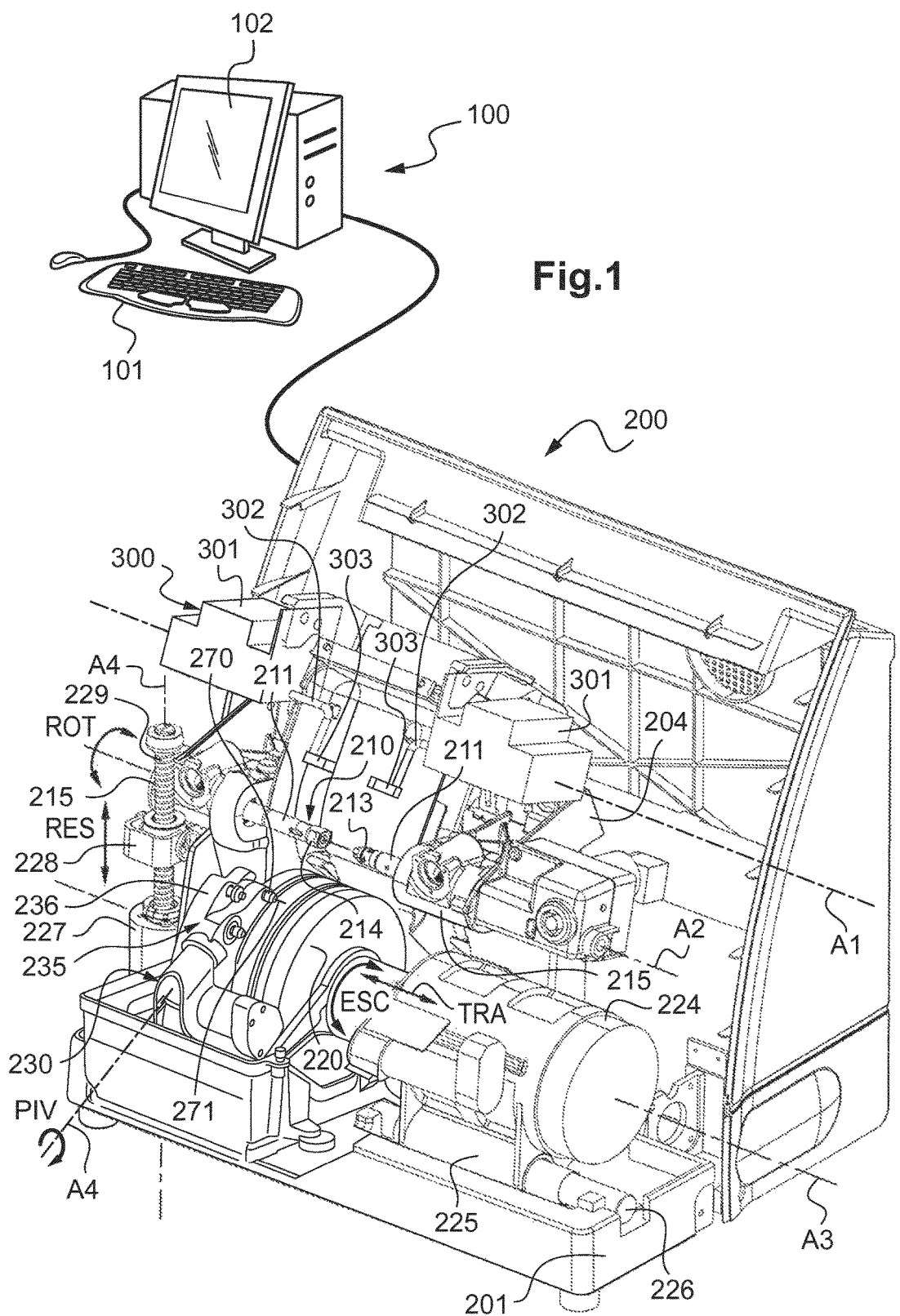
FIG. 1 is a schematic perspective view of a trimming machine according to the invention, comprising in particular a finishing arm.

FIG. 1 shows a trimming device intended to implement this etching operation on any type of optical lens (objective lens, solar lenses, etc.), in particular on ophthalmic lenses.

Such a trimming device is generally located in an optician's laboratory, in order to allow him to mount a pair of ophthalmic lenses on a frame selected by a future wearer.

This mounting operation is broken down into four main operations:

the acquisition of a desired outline along which each ophthalmic lens should be trimmed;

the centering of the desired outline in the frame of reference of the corresponding lens, which consists in determining the position that each lens will occupy in the frame in order to be properly centered with respect to the pupil of the wearer's eye so that said lens properly performs the optical function for which it was designed;

the immobilizing of each lens, which consists in fixing to each lens an immobilizing accessory that allows the machining device to take hold of the lens and to store the position of the frame of reference of this lens; and the trimming of each lens, which consists in machining or cutting it around the desired outline, taking the defined centering parameters into account.

Figure 6:
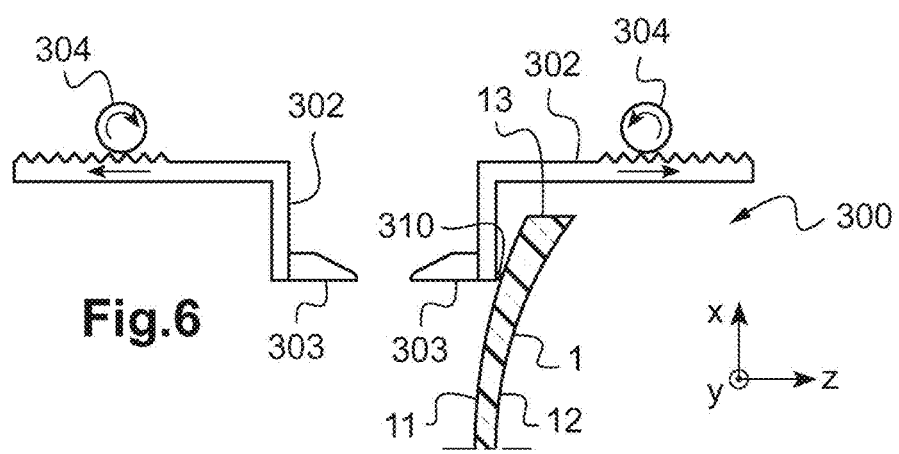
FIG. 6 is a schematic view of the sensors of the trimming machine from FIG. 1.

FIG. 6 shows a cross-sectional view of a part of an ophthalmic lens 1 to be trimmed.

Such an ophthalmic lens 1 has a front optical face 11 and a rear optical face 12 and an initially circular edge 13 which is to be brought to the shape of the desired outline such that the ophthalmic lens 1 can then be fixed to the selected spectacle frame.

Figure 8:
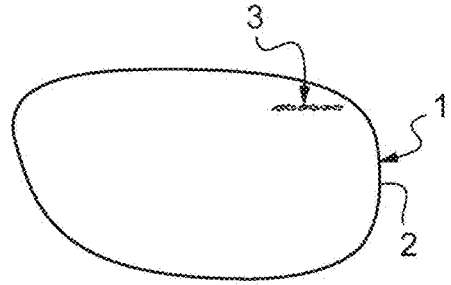
FIGS. 8 to 12 are front views of ophthalmic lenses having different etching patterns.

FIG. 8 shows a particular example of a desired outline shape 2.

Such an ophthalmic lens 1 could comprise a substrate of any material type, for example organic, polycarbonate, Trivex®, Tribrid®, etc. Its substrate will preferably be covered with a surface coating, for example an antireflective coating, an antifog coating, etc.

The point on the ophthalmic lens where the magnifying effect is zero (that is to say, in the case of a lens having an exclusively spherical optical power, the point at which the incident ray and the transmitted ray lie on the same axis) is known as the optical center.

In the case of a lens having a progressive variation in power (known as a "progressive lens"), a near vision point (situated in the lower part of the ophthalmic lens 1) and a distance vision point (situated in the upper part of the ophthalmic lens 1) could also be defined.

Trimming Machine

In order to trim this ophthalmic lens 1, the latter is placed in the trimming machine 200 that is known per se and described in detail in the document WO2008/043910.

Such a machine, as illustrated in FIG. 1, is a grinder 200 which comprises:

a chassis 201 fixed on a working plane (not shown),
means 210 for immobilizing the ophthalmic lens 1;
a set of large-diameter grinding wheels 220;
a finishing arm 235 which carries a plurality of finishing tools;
an acquisition means 300 for acquiring geometric characteristics $x_i$, $y_i$, $z_i$, relating to the shape of at least one of the optical faces 11 of the ophthalmic lens 1; and
a calculating and driving device (known as a computer 100) for driving the various members of the grinder 200.

The set of grinding wheels 220 comprises a plurality of grinding wheels mounted on a common shaft for driving them in rotation about a grinding axis A3, in practice a horizontal axis. The rotation of this common shaft, which is not visible in the figures, is controlled by an electric motor 224 driven by the computer 100.

The set of grinding wheels 220 comprises in particular a large cylindrical roughing grinding wheel and a large beveling grinding wheel that has a beveling groove. It also comprises two large polishing grinding wheels that have shapes corresponding to those of the roughing and beveling grinding wheels but with different grains.

This set of grinding wheels is mounted so as to be able to move in translation on the chassis 201 along an axis parallel to the grinding axis A3. In this case, the assembly consisting of the set of grinding wheels, its shaft and its motor is borne by a carriage 225 which is itself mounted on glideways 226 secured to the chassis 3 and which is actuated by an electric motor. This is known as transfer mobility TRA.

The means 210 for immobilizing the ophthalmic lens 1 in this case comprise more specifically two shafts 211 for clamping the ophthalmic lens 1 to be trimmed and driving it in rotation. These two shafts 211 are aligned with one another along an immobilization axis A2 parallel to the grinding axis A3.

Each of these shafts 211 has a free end which faces the other, one of which is equipped with an immobilizing point 214 for immobilizing the ophthalmic lens 1 and the other of which is equipped with a means 213 for receiving an accessory for immobilizing the lens (prepositioned on the lens when the latter is immobilized).

This immobilizing accessory is conventionally positioned on the ophthalmic lens at a given point and with a given orientation, making it possible to locate the position of the frame of reference of the ophthalmic lens with respect to the frame of reference of the chassis 201 of the grinder 200.

The two shafts 211 are driven in rotation about the immobilization axis A2 by synchronous motors 215. They can make the ophthalmic lens 1 pivot through one complete revolution (360 degrees). This is known as rotational mobility ROT.

In a variant, provision could be made to equip only one of the two shafts with a motor, the other shaft then being mounted so as to rotate freely in order to follow the rotation of the first shaft.

In another variant, provision could be made of a single motor mounted so as to be able to drive the two shafts in rotation, by means of gears or belts.

Here, a first of the two shafts 211 is fixed in terms of translation along the immobilization axis A2. By contrast, the second of the two shafts 211 is able to move in translation along the immobilization axis A2 in order to clamp the ophthalmic lens 1 in axial compression between the two shafts.

The two shafts 211 are in this case carried by a rocker 204 that is mounted on the chassis 201 so as to pivot about a rocker axis A1, in practice a horizontal axis parallel to the immobilization axis A2.

In order to allow dynamic adjustment of the inter-axis distance between the immobilization axis A2 and the grinding axis A3, use is made of the ability of the rocker 204 to pivot about the rocker axis A1. Specifically, this pivoting causes the ophthalmic lens clamped between the shafts 211 to move, in this case approximately vertically, thereby moving the lens toward or away from the set of grinding wheels 220. This is known as restitution mobility RES.

This restitution mobility RES is implemented with the aid of a screw-nut system. This system comprises, on the one hand, a restitution motor 227, secured to the chassis 201, which drives a threaded rod 229 with a vertical axis perpendicular to the rocker axis A1 in rotation, and, on the other hand, a nut 228 which engages with this threaded rod 229 and which is secured to the rocker 204.

In order to machine the ophthalmic lens along the desired outline 2, it is therefore enough, on the one hand, to move the nut 228 accordingly along the threaded rod 229, under the control of the restitution motor 227, and, on the other hand, to make the supporting shafts 211 pivot together about the immobilization axis A2.

The finishing arm 235 is mounted on the carriage 225, and so it takes advantage of the transfer mobility TRA. It also has two pivoting mobilities ESC, PIV with respect to the chassis 201, about two transverse axes, one of which is parallel to the immobilization axis A2.

In practice, the finishing arm 235 is mounted in a pivoting manner on a lever 230 which is itself mounted in a pivoting manner on the carriage 225.

The lever 230 is mounted in a pivoting manner on the carriage 225 by a first of its ends, about the grinding axis A3.

It has a travel about the grinding axis A3 of less than 180 degrees. This is known as retraction mobility ESC.

Its second end, which is curved about the set of grinding wheels 220, has a housing in which a pin of the finishing arm 235 is mounted so as to pivot about an adjustment axis A4 orthogonal to the grinding axis A3. The finishing arm 235 can thus pivot about this adjustment axis A4 with a travel of less than 180 degrees. This is known as pivoting mobility PIV.

This finishing arm 235 comprises a casing 236 which extends lengthwise along an arc of a circle so as to match the shape of the set of grinding wheels 220 about which it pivots.

Figure 2:
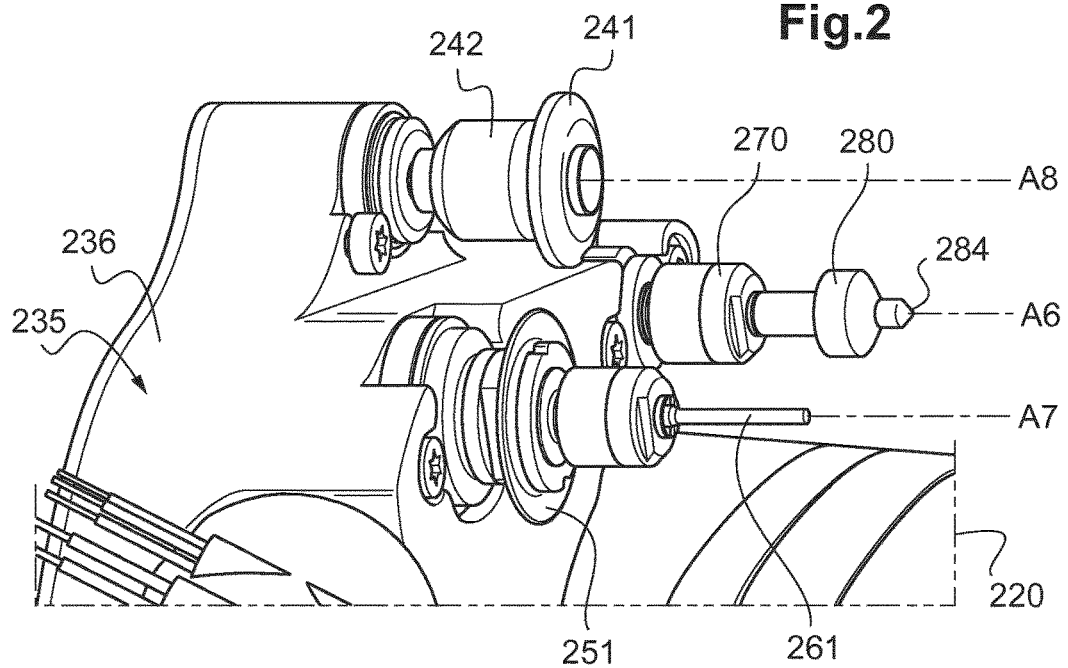
FIG. 2 is a detail view of the finishing arm from FIG. 1, carrying an etching tool.

As is shown more particularly in FIG. 2, this casing 236 carries five tools that are distributed in three groups of one or two tools. Each group is designed to rotate about a separate rotation axis A6, A7, A8 from the rotation axes of the other groups of tools. These rotation axes are in this case mutually parallel and orthogonal to the adjustment axis A4.

A first group of tools, disposed at the free end of the casing 236, comprises a single drilling tool. This drilling tool conventionally comprises a drill bit 271 for drilling the ophthalmic lens (visible only in FIG. 1), a chuck 270 for holding the drill bit 271, and a clamping ring for clamping the chuck 270 to the drill bit 271. The chuck 270 is able to rotate about a rotation axis A6 orthogonal to the adjustment axis A4. Depending on the orientation of the finishing arm 235 about the adjustment axis A4, the rotation axis A6 of the drilling tool may be parallel or inclined with respect to the immobilization axis A2 of the ophthalmic lens. The orientation of the finishing arm 235 thus makes it possible to incline the drill bit 271 with respect to the ophthalmic lens, so as to drill the latter along the desired axis.

A second group of tools comprises a stack of two separate tools, specifically a mini grooving wheel 251 and a tool 261 for milling and trimming the ophthalmic lens. These two tools are designed to rotate about a single axis of rotation A7.

A third group of tools also comprises a stack of two separate tools, specifically a mini finishing wheel 241 and a mini polishing wheel 242. These two tools are designed to rotate about a single axis of rotation A8.

These five tools are all driven in rotation by a geared motor assembly which comprises a single electric motor housed inside the casing 236.

In FIG. 1, the chuck 270 is equipped with a drill bit 271.

As is shown in FIG. 2, this chuck 270 can also accommodate a specific etching tool 280.

Figure 4:
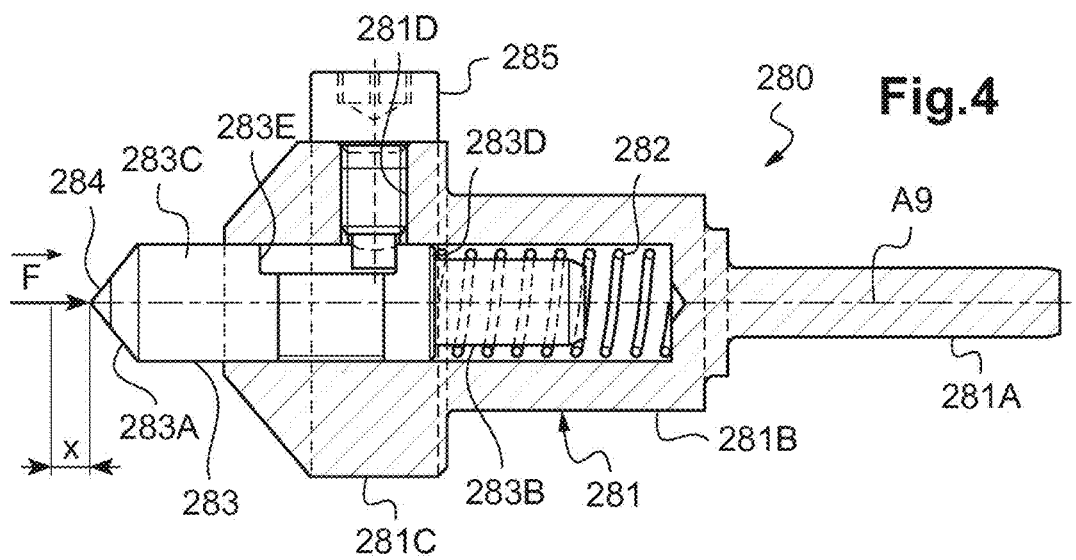
FIG. 4 is a sectional view of the etching tool from FIG. 2.

This etching tool 280 is shown in detail in FIG. 4. It is provided in order to make it possible to etch any type of pattern on the front optical face 11 of the ophthalmic lens 1.

The fact that it is mounted on the finishing arm 235 makes it possible to take advantage of the mobilities of the grinder 200 in order to etch the lens, to the benefit of the cost of etching.

In this case, the etching tool 280 comprises:
a supporting rod 283 that is elongate along an etching axis A9,
an etching point 284 that is fixed to a first end 283A of the supporting rod 283,
a sheath 281 inside which the supporting rod 283 is engaged by way of its second end 283B, such that the supporting rod 283 is free to slide along the etching axis A9,
a return means for returning the supporting rod 283 into the extended position (projecting out of the sheath 281), and
a stop means 285 for limiting the travel of the supporting rod 283 in the sheath 281.

The etching point 284 is made of a different material than that of the supporting rod 283. It may be made in particular of diamond, ruby or coated carbide. It also has a shape that gives it an abrasive capability, in contrast to the supporting rod 283 which is very much less hard.

This etching point 284 has in this case the shape of a cone of revolution about an etching axis A9, with a vertex angle of between 90 and 110 degrees, in this case equal to 100 degrees. The vertex of this etching point 284 is particularly sharp since it has a radius of curvature of 0.03 mm. The height of this etching point 284 is less than 5 mm. In this case it is equal to 1 mm. The diameter at the base of this etching point 284 is for its part 1.2 mm.

The supporting rod 283 has a central part 283C that is in the overall shape of a cylinder of revolution about the etching axis A9. Its first end 283A is in the form of a truncated cone of revolution about the etching axis A9 so as to continue the surface of the etching point 284 that it bears. Its second end 283B is in the form of a cylinder of revolution about the etching axis A9 with a smaller diameter compared to that of the central part 283C, thereby delimiting a shoulder 283D.

The sheath 281 comprises a tubular body 281B of revolution about the etching axis A9, which internally delimits a housing for accommodating the supporting rod 283. This accommodating housing is open on one side to allow the supporting rod 283 to protrude therefrom. However, it is closed on the opposite side.

The tubular body 281B is extended, on the side of its closed end, by a gripping rod 281A of smaller diameter, which may be inserted into and clamped in the chuck 270.

The tubular body 281B externally has a widening of section 281C in which there is provided a tapped bore 281D with a radial axis with respect to the etching axis A9.

The stop means is then formed by a screw 285 which is screwed into this tapped bore 281D such that its end leads into the inside of the accommodating housing.

An oblong groove 283E is provided in a corresponding manner, recessed into the central part 283C of the supporting rod 283. This oblong groove 283E is elongate along the etching axis A9 and is provided so as to slide along the end of the screw 285. This screw 285 thus makes it possible to limit the travel of the supporting rod 283 between two end positions, extended and depressed. In this case, the length of this oblong groove 283E is adapted such that the two end positions, extended and depressed, are separated from one another by a distance of between 1 and 4 mm, in this case equal to 2 mm.

The return means for returning the supporting rod 283 into the extended position is formed here by a compression spring 282.

This compression spring 282 is threaded onto the second end 283B of the supporting rod 283 and is interposed between the bottom of the accommodating housing provided in the sheath 281 and the shoulder 283D of the supporting rod 283.

Figure 5:
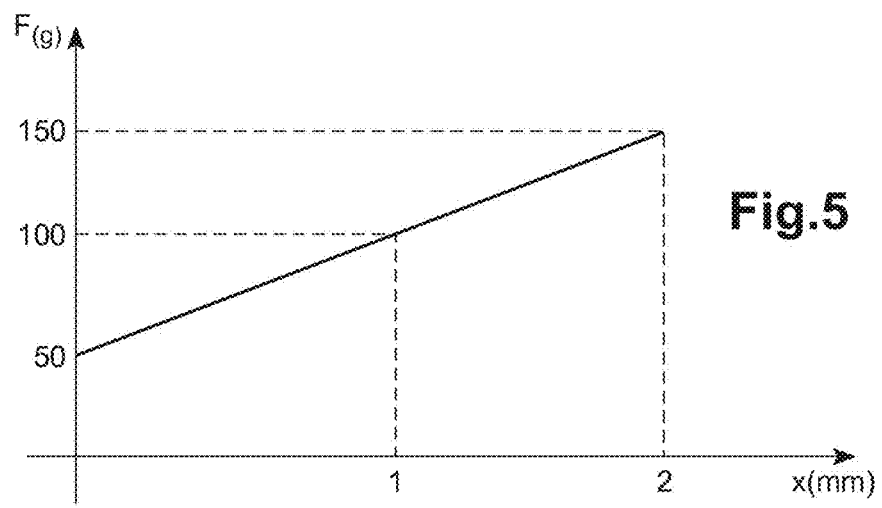
FIG. 5 is a graph illustrating the variations in the stress applied to the spring of the etching tool from FIG. 2, as a function of the movement imposed on this spring.

This compression spring 282 is mounted in a pretensioned manner in the accommodating housing. Thus, as is shown in FIG. 5, it is necessary here to exert a force of 50 grams on the etching point 284, along the etching axis A9, in order to start to compress this spring.

Next, the depth of depression p of the supporting rod 283 into the accommodating housing in the sheath 281 varies linearly depending on the force F axially applied to the etching point 284.

It is thus necessary to apply an axial force of 150 grams to the etching point 284 in order for the supporting rod 283 to reach its depressed position.

Figure 3:
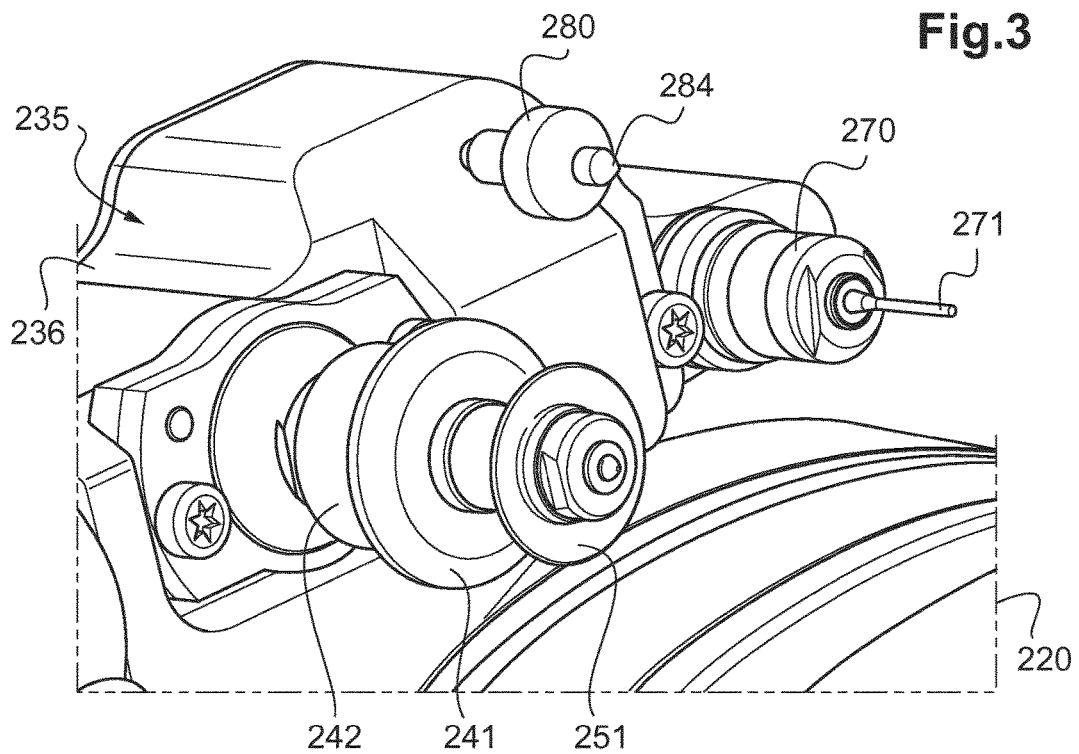
FIG. 3 is a detail view of a variant embodiment of the finishing arm from FIG. 2.

In a variant, as is shown in FIG. 3, provision could be made to fix the etching tool 280 not in the chuck of one of the tools carried by the finishing arm 235 but rather in the casing 236 of the finishing arm 235 itself. It could thus be screwed into a tapped bore provided in this casing 236 or, as is the case in FIG. 3, be force-fitted into a blind hole provided in the casing 236.

This solution will preferably be used if the finishing arm 235 only carries rotary tools that rotate about one or two different axes.

Specifically, in FIG. 3, it can be seen, on the one hand, that provision is not made of a milling cutter, and, on the other hand, that the mini finishing wheel 241 and mini polishing wheel 242 are mounted on the same axis as the mini grooving wheel 251.

The acquisition means 300 for acquiring geometric characteristics $x_i$, $y_i$, $z_i$, relating to the shape of the optical faces 11, 12 of the ophthalmic lens 1 is shown in FIGS. 1 and 6.

As is clearly shown in FIG. 6, this acquisition means 300 in this case comprises two sensors 302 that are respectively designed to come into contact with the two optical faces 11, 12 of the ophthalmic lens 1.

The sensors 302 are designed to independently or jointly sense the two optical faces 11, 12 of the ophthalmic lens 1. To this end, these sensors 302 comprise two L-shaped arms, the ends of which form sensor noses 303 that are turned toward one another.

The two sensors 302 are mounted so as to be able to move in translation with respect to the chassis 201 of the grinder 200. This movement in translation makes it possible to move the two sensor noses 303 away from or toward the ophthalmic lens 1. The movements in translation of the sensors 302 are controlled independently of one another by encoding electric motors 304 which are integrated into casings 301 (FIG. 1) and are driven by the computer 100. The driving in translation and the permanent tracking of the position of the sensors 302 by the encoding electric motors 304 are carried out by way of a rack and pinion mechanism, each pinion being driven by the corresponding motor and the associated rack being secured to the sensors 302.

During the sensing of the lens, consideration will be given here to an orthonormal frame of reference of the grinder (X, Y, Z), the abscissa vector X and ordinate vector Y of which are orthogonal to the immobilization axis A2.

In order to sense a point $P_i(x_i, y_i)$ on the front optical face 11 of the ophthalmic lens 1, it is enough, on the one hand, to move the nut 228 accordingly along the threaded rod 229, under the control of the restitution motor 227, and, on the other hand, to make the supporting shafts 211 pivot together under the control of the motors 215. Specifically, the rotation mobility ROT and restitution mobility RES make it possible to place the point $P_i$ opposite the sensors 302. The encoding electric motors 304 then make it possible to return the sensor noses 303 into contact with the two optical faces 11, 12 of the ophthalmic lens 1 and to obtain the altitude $z_i$ of the point $P_i$.

As is clearly shown in FIG. 6, the sensor 302 designed to sense the rear optical face 12 of the ophthalmic lens 1 is equipped with a marker 310 which has its back to the sensor nose 303 and which points in a direction away from that of this nose. This marker 310 has an identical shape to that of the etching point 284. It thus makes it possible to enhance the etching patterns by coloring them (in this case in black).

The computer 100 is in this case shown in FIG. 1 in the form of a desktop computer equipped with a keyboard 101 and a screen 102. Typically, this computer 100 will preferably be integrated into the electronic system and/or computer system of the grinder 200 and will be connected to a touchscreen for displaying and entering information.

In order to drive the different mobilities of the grinder 200, the computer 100 comprises a processor (CPU), a random access memory (RAM), a read-only memory (ROM), analog to digital (A/D) converters and various input and output interfaces.

By virtue of its input interfaces, the computer 100 is designed to acquire information relating to the frame of reference of the ophthalmic lens 1, to the shape and type of the selected spectacle frame, to the material of the ophthalmic lens 1, to the shape of the desired etching patterns, etc.

By virtue of software stored in its read-only memory, the computer 100 is designed to use these various items of information to define trimming instructions CONS1 for the ophthalmic lens 1, drilling instructions for the ophthalmic lens 1 if the latter is intended to be mounted in a spectacle frame of the rimless type, and etching instructions CONS2 for the front optical face 11 of the ophthalmic lens 1.

Finally, by virtue of its output interfaces, the computer 100 is designed to transmit these instructions to the various motors of the grinder 200, in order to implement trimming, drilling and etching of the ophthalmic lens 1.

Machining Method

That part of the method for preparing the ophthalmic lens 1 which is implemented by the grinder 200 is broken down into a number of steps of immobilizing the ophthalmic lens 1, sensing the ophthalmic lens 1, defining trimming instructions CONS1 and etching instructions CONS2, trimming the ophthalmic lens 1 and then etching the front optical face 11 of the ophthalmic lens 1.

It will be noted that, although the etching step in this case follows the trimming step, it will also be possible to implement the etching step before the trimming step.

During the first step, the ophthalmic lens 1 equipped with its immobilizing accessory is introduced between the two shafts 211 of the grinder 200. These two shafts 211 are then driven by the computer 100 in order to clamp the ophthalmic lens 1 in axial compression along the immobilization axis A2.

During the second step, the computer 100 drives the restitution mobility RES of the grinder 200 so as to place the ophthalmic lens 1 between the two sensors 302.

It then drives the encoding electric motors 304 such that the latter return the sensor noses 303 into contact with the two optical faces 11, 12 of the ophthalmic lens 1.

Next, the computer 100 drives the rotation mobility ROT and restitution mobility RES of the grinder 200 in combination such that the ophthalmic lens 1 is moved between the two sensors 302, thereby making it possible to obtain the three-dimensional coordinates ($x_i$, $y_i$, $z_i$) of a plurality of points $P_i$ on the optical faces 11, 12 of the ophthalmic lens 1.

The third step consists in defining the trimming instructions CONS1 and etching instructions CONS2 depending in particular on the three-dimensional coordinates ($x_i$, $y_i$, $z_i$) acquired.

Since the definition of trimming instructions CONS1 is well known to a person skilled in the art, for example from the document EP2306236, it will not be described here.

However, the definition of the etching instructions CONS2, which is more particularly the subject of the present invention, will be described in detail here.

During this definition step, the first operation of the computer 100 consists in identifying, inside the desired outline 2, at least one suitable zone 4 in which the etching pattern 3 can be etched.

Figure 7:
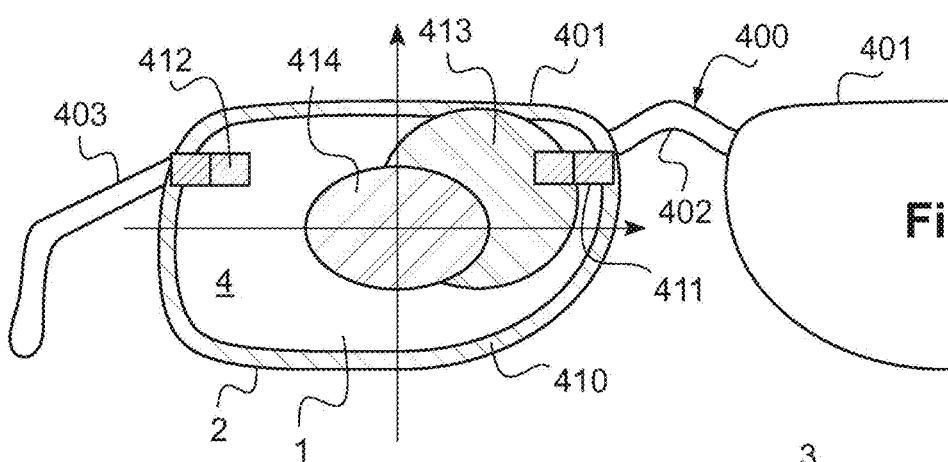
FIG. 7 is a view illustrating the zones of an ophthalmic lens which must not be etched by machining.

For this purpose, as is shown in FIG. 7, the computer 100 acquires at least the first two parameters in the following list:

the geometry of the desired outline 2, the shape and the position, relative to the desired outline 2, of the zone of contact 414 between the front optical face 11 and the immobilizing accessory 210, the shape and the position, relative to the desired outline 2, of the optically useful zone 413 of the front optical face 11, the shape and the position, relative to the desired outline 2, of the zones 411 for attaching the bridge 402 and the temple 403 of the selected spectacle frame 400, the shape and the position, relative to the desired outline 2, of the surrounding zone 410 of the rim 401 of the selected spectacle frame 400.

In this case, the computer 100 acquires the first three parameters mentioned above, and also one or the other of the last two.

These various parameters are obtained in the following manner here.

The geometry of the desired outline 2 is received here from a spectacle frame reading apparatus (not shown) which senses the shape of the bezels of the rims 401 of the selected spectacle frame 400 (in the case of a frame of the full-rimmed type) or which senses the shape of the edges of presentation lenses (in the case of a frame of the rimless or half-rimmed type), which deduces therefrom the three-dimensional shape which the outline of the ophthalmic lens 1 should have in order to be mounted in the selected spectacle frame 400, and which transmits this shape to the grinder 200 in the form of an electronic file.

The position and the shape of the zone of contact 414 between the front optical face 11 and the immobilizing accessory 210 are received from the lens immobilizing apparatus (the one which places the immobilizing accessory on the lens), taking the shape of the chosen immobilizing accessory 210 and defined centering parameters into account.

The optically useful zone 413 of the front optical face 11 corresponds to the zone of the lens that the future wearer will frequently make use of when he looks through the ophthalmic lens 1.

In the case of a lens that has an exclusively spherical optical power, this optically useful zone 413 could be defined as being a zone centered on the optical center of the lens, which is in the form of a disk having a predetermined radius of between 7 and 25 mm, in this case equal to 15 mm.

In the case of a lens having a progressive variation in power (known as a "progressive lens"), this optically useful zone 413 could be defined as being an oval zone of which the focal points are formed by the near vision and distance vision points of the lens, and of which the minor axis has a predetermined value of between 7 and 25 mm, in this case equal to 15 mm.

The zones 411, 412 for attaching the bridge 402 and the temple 403 of the selected spectacle frame 400 correspond to the zones in which the drill holes will be made (in the case in which the selected spectacle frame 400 is of the rimless type).

In this case, these zones are square, centered on the points at which the ophthalmic lens is drilled, and have a width of between 2 and 12 mm, in this case equal to 6 mm. Generally, since two drill holes are provided for mounting the bridge and two other drill holes are provided for mounting the temple, the zones have rectangular shapes per pair.

For its part, the surrounding zone 410 of the rim 401 of the selected spectacle frame 400 corresponds to the zone of the edge of the ophthalmic lens 1 which will be covered by the spectacle frame 100 (in the case in which the frame is of the full-rimmed or half-rimmed type). In this case, this zone corresponds to a strip which borders the desired outline 2 and which has a width of between 1 and 6 mm, in this case equal to 3 mm.

These zones thus form interference zones 410, 411, 412, 413, 414. Once these zones have been identified, the computer 100 considers the remaining part of the internal zone of the desired outline 2 to be the suitable zone 4 in which the etching pattern 3 should be realized.

However, it will be understood that, if the etching pattern consists of a manufacturer reference which is intended to be etched but is not intended to remain visible, it may be preferable to etch this reference in this surrounding zone 410.

The computer 100 then acquires the shape to be etched on the ophthalmic lens 1. This shape, known as the "etching pattern 3", corresponds to the shape the etching point 284 should draw on the front optical face 11 of the ophthalmic lens 1.

The size of this etching pattern 3 is between 3 mm and 15 mm so as to be visible but not to be in the way of the future wearer.

This acquisition can take place in various manners.

Figure 9:
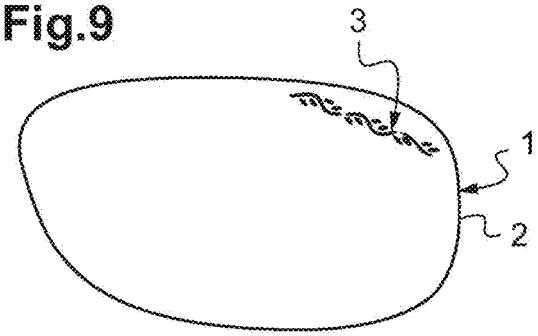
Figure 10:
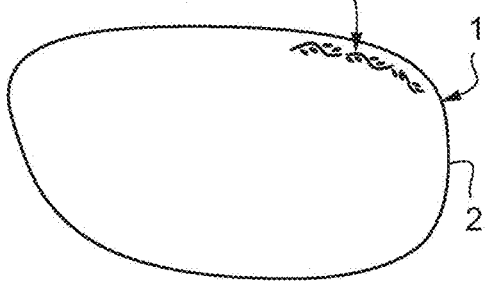

Thus, a database which stores various etching patterns could then be provided in the read-only memory of the computer 100. Therefore, the future wearer could choose the etching pattern he prefers from the screen 102. As FIGS. 8 to 10 show, this etching pattern could represent for example a branch of a tree with leaves.

Provision could be made for this pattern to be duplicated as desired in order to be etched several times on the ophthalmic lens 1, for example to form a border.

Figure 11:
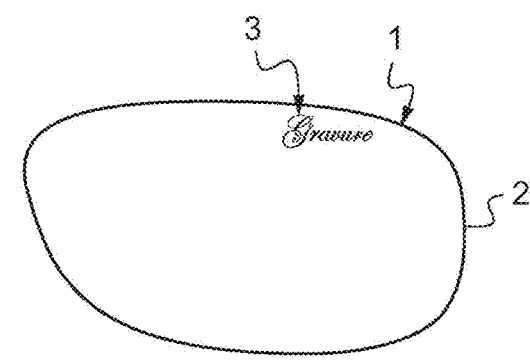

In a variant, the optician can enter characters on the keyboard 101 so as to have them etched onto the ophthalmic lens 1. As FIG. 11 shows, this etching pattern could form for example a word or any desired reference.

It may thus be a tracking code for the ophthalmic lens, which could be stored at the same time in an external database. This code could thus be subsequently read from the lens by an optician so that this optician can find the various features of the ophthalmic lens in this database (without it being necessary to measure them).

In a further variant, the word or reference can be stored in the read-only memory of the computer 100 in order to be etched systematically on all of the ophthalmic lenses 1 machined by the grinder 200. Provision could thus be made to etch the name of the optician's shop on all of these ophthalmic lenses.

According to another variant, when the spectacle frame is of the "adhesively bonded" type (that is to say that the ends of the bridge 402 and of the temples 403 of the spectacle frame 400 are intended to be adhesively bonded to the front optical faces 11 of the ophthalmic lenses 1), the optician can simply enter the model of the spectacle frame. A database which stores various etching patterns depending on the model entered could thus be provided in the read-only memory of the computer 100.

Specifically, although the glue adheres correctly to the substrate of the lens, it does not adhere to the coating layer. Consequently, in the case of such a frame, it is necessary to locally remove the coating layer from the lenses in order to expose the substrate of the ophthalmic lens so as to adhesively bond the spectacle frame thereto.

Figure 12:
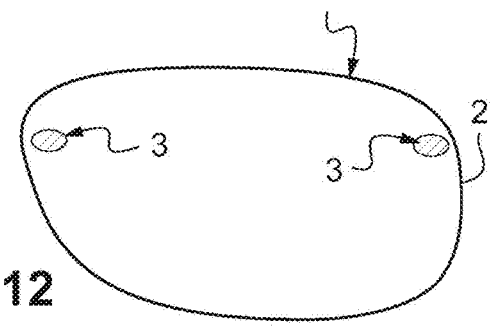

Once the frame model has been entered, the computer 100 reads the shapes of the surfaces for adhesively bonding the spectacle frame to the lens from the database. In this way, the etching tool could remove the coating layer in the region of the zones intended to receive glue (see FIG. 12).

Once the shape of the etching pattern(s) 3 has been acquired, this etching pattern 3 is then positioned with respect to the desired outline 2.

This positioning step can be carried out automatically by the computer 100.

The computer 100 can then for example choose to systematically place the etching pattern horizontally, in the zone situated at the top and on the temporal side of the desired outline, inside the suitable zone 4 (see FIG. 8).

In a variant, the position and the size of the etching pattern 3 could be adjusted manually by the optician, under the control of the computer 100.

In this case, the only function of the computer 100 will be to prevent the optician from positioning the etching pattern 3 outside the suitable zone 4.

However, the optician will be free to move, incline, or decrease or increase the size of the etching pattern 3 (see FIG. 9). He will also be free to deform the etching pattern 3, for example in order to apply a symmetry-type transformation thereto or to make it border the desired outline 2 (FIG. 10). The optician will also be free to choose the size and the typeface of the etching pattern 3 (FIG. 11).

In the case in which the spectacle frame is of the adhesively bonded type (FIG. 12), the optician could best adjust the positions of the etching patterns 3 relative to the desired outline 2 (one in a temporal zone for adhesively bonding the temple, and the other in a nasal zone for adhesively bonding the bridge), such that, once it has been adhesively bonded to its two ophthalmic lenses 1, the spectacle frame is adjusted best to the morphology of the face of the future spectacle wearer.

At the end of this positioning step, the computer 100 provides the optician with the choice of the thickness of the line to be etched (which will determine the force which the etching tool 280 has to apply to the ophthalmic lens 1). It could thus display three visibility values on the screen 102: low, normal, and high.

The computer 100 then implements the step of trimming the ophthalmic lens 100.

This step is carried out in three successive operations of roughing, finishing and fine-finishing. The roughing operation consists in bringing the initial outline of the lens to an outline close or identical to the desired outline 2. The finishing operation consists in beveling the edge of the lens along the desired outline 2 if said lens is intended to be mounted on a full-rimmed spectacle frame, in grooving the edge of the lens along the desired outline 2 if said lens is intended to be mounted on a half-rimmed spectacle frame, or in drilling the lens if said lens is intended to be mounted on a rimless spectacle frame. For its part, the fine-finishing operation consists in polishing and chamfering the sharp edges of the edge of the lens if need be.

These operations are well known to a person skilled in the art and are not as such the subject of the present invention. They will therefore not be described in more detail here.

Once this trimming step has been carried out, the optician removes the drill bit 271 from the chuck 270 and replaces it with the etching tool 280.

The computer 100 then implements the step of etching the etching pattern 3 on the front optical face 11 of the ophthalmic lens 1.

To this end, it jointly drives the transfer mobility TRA, restitution mobility RES, and rotation mobility ROT in accordance with the etching instructions CONS2, such that the etching point 284 slides continuously on the front optical face 11 of the lens.

This is indeed continuous sliding in that the tool is not intended to strike the lens at multiple points in order to form a pattern but rather slides without interruption so as to draw each line (that is to say each scratch) that forms the etching pattern 3.

During this etching step, the retraction mobility ESC and pivoting mobility PIV are continuously driven by the computer, such that the etching axis A9 of the etching tool 280 remains orthogonal to the plane which is tangential to the front optical face 11 of the ophthalmic lens 1 at the point of contact between the etching point 284 and the front optical face 11.

In this way, the etching point 284 is pressed into the ophthalmic lens 1 at right angles, thereby avoiding a situation in which one of the flanks of the scratch is wider than the other.

Of course, in a variant, provision could have been made not to drive the retraction mobility ESC and pivoting mobility PIV, such that the etching axis A9 of the etching tool 280 remains parallel to the immobilization axis A2.

Provision could also have been made to only drive the retraction mobility ESC and pivoting mobility PIV at the start of the etching operation, such that the etching axis A9 is positioned orthogonally to the plane which is tangential to the front optical face 11 of the ophthalmic lens 1 at the initial point of contact between the etching point 284 and the front optical face 11. These mobilities would then no longer be driven during the sliding of the etching point 284 on the front optical face 11. Since the etching pattern 3 has a reduced dimension, it is known, however, that the axis A9 will remain substantially orthogonal to the plane which is tangential to the front optical face 11 of the ophthalmic lens 1 at the point of contact between the etching point 284 and the front optical face 11 (to within a few degrees, that is to say to within 10 degrees at most).

In this case, the various mobilities used, and more particularly the transfer mobility TRA, are driven such that the etching point 284 exerts a given force on the front optical face 11 of the ophthalmic lens 1. Specifically, the depth and the width of the scratch etched into the ophthalmic lens 1 depend on this force.

In this case, the etching tool 280 is driven relative to the arms 211 such that the scratch has a width and a depth of between 0.005 and 0.5 millimeter, preferably between 0.02 and 0.1 mm.

In practice, the computer 100 drives the various mobilities such that the scratch(es) forming the etching pattern 3 have a constant thickness and depth. It could of course be otherwise.

The adjustment of the effective depth p' of the scratch is carried out in the following manner.

The computer 100 does not drive the etching tool 280 into position such that the etching point 284 is flush with the front optical face 11 of the ophthalmic lens 1, but rather such that it passes theoretically into the material of the ophthalmic lens 100 to a setpoint depth P.

As a result of this bearing, the supporting rod 283 is pressed into the sheath 281 by a given depression depth p.

The setpoint depth P, the effective depth p' of the scratch obtained and the depression depth p are linked by the following equation:

$$P = p + p'.$$

However, the relationship between the force F exerted on the lens and the effective depth p' of the scratch (taking the material of the lens into account), and also the relationship between the depression depth p and the force F exerted on the lens are known (FIG. 5). Thus, by adjusting the setpoint depth P, it will be understood that it is possible to obtain a scratch with a desired effective depth p'.

In practice, this etching step could be carried out after the trimming of the two lenses in one and the same lens job (that is to say after the trimming of the two lenses to be mounted on the selected spectacle frame), thereby avoiding a situation in which the optician has to change the tool fitted on the chuck 270 several times.

Of course, in the variant embodiment of the grinder shown in FIG. 3, since the etching tool 280 remains in position, the two lenses of the job could be trimmed and etched in any desired order.

The final step consists, if the future wearer so desires, in enhancing the etching pattern 3 by coloring it.

As shown in FIG. 6, during this step, the computer 100 drives the rotation mobility ROT and restitution mobility RES of the grinder 200 so as to place the ophthalmic lens 1 in line with the two sensors 302.

It then drives the encoding electric motor 304 of the right-hand sensor 302 (the one which is ab origine intended to sense the rear optical face 12 of the lens) so as to introduce its marker 310 into the etching pattern 3 and to return it into this position.

Next, the computer 100 once again drives the rotation mobility ROT and restitution mobility RES of the grinder 200 such that the ophthalmic lens 1 moves against the marker 310, in accordance with the etching instructions CONS2, thereby making it possible to color the entirety of the etching pattern 3.

The present invention is in no way limited to the embodiment described and shown, but a person skilled in the art will know how to apply thereto any variant in accordance with the spirit thereof.

Thus, provision could have been made for the etching tool not to be mounted on the finishing arm but rather on one of the sensors, instead of the marker. The drawback of this solution compared with the one set out above is that it does not make it possible to incline the etching tool with respect to the lens such that the etching point remains orthogonal to the plane tangential to the lens at the point of contact between the lens and the etching point. The advantage of this solution is that the etching tool could consist simply of the etching point. Specifically, in this variant, the motor which meshes with the rack of the sensor could be driven "in force", such that the etching point exerts the desired force on the ophthalmic lens.

In another variant of the invention, provision could be made for the etching tool simply to comprise an etching point mounted in front of a strain gage fixed to the finishing arm. In this variant, the various mobilities of the grinder will then be driven depending on the force measured by this strain gage, such that the etching point exerts the desired force on the ophthalmic lens.

According to another variant of the invention, provision could be made not to etch the ophthalmic lens with the aid of a specialized tool but rather with the point of the drill bit or with the point of the milling cutter.

In yet another variant, while the calculation of the etching instructions is carried out here by the computer of the grinder, it could of course be carried out, in a variant, by a calculation means external to the grinder and then transmitted to the latter.

It will also be possible to provide for the etching to be carried out not by the optician himself but by the lens manufacturer, as long as the latter is in charge not only of molding and surfacing the lens but also of trimming the lens. In this variant, the shape of the etching pattern will be chosen by the future glasses wearer at the optician's, and the latter will then need to send this choice to the lens manufacturer.

The invention claimed is:

1. A method for machining an optical lens using a trimming machine, the method comprising:
   immobilizing said optical lens on an immobilizing system of said trimming machine;
   acquiring geometric characteristics relating to the shape of at least one of the optical faces of the optical lens;
   defining trimming instructions for the optical lens as a function of the acquired geometric characteristics;
   trimming the optical lens around a desired outline, during which a trimming tool of the trimming machine is driven relative to said immobilizing system according to said trimming instructions;
   defining etching instructions for said optical face of the optical lens as a function of the acquired geometric characteristics by
   acquiring the shape and the position of at least one interference zone comprising at least a zone of contact between said optical face and said immobilizing system, and
   identifying, inside the desired outline, at least one suitable zone in which the line can be etched, taking the shape and the position of each interference zone into account; and
   etching said optical face of the optical lens along a line situated inside said desired outline, during which a sharp etching tool of said trimming machine is driven relative to said immobilizing system according to said etching instructions such that a point of the tool slides continuously on said optical face in order to scratch the optical face along said line.

2. The machining method as claimed in claim 1, wherein, during the etching said etching tool is driven relative to said immobilizing system such that the tool creates a scratch on said optical face, said scratch having a width and a depth of between 0.005 and 0.5 millimeter.

3. The machining method as claimed in claim 1, wherein said point has an axis of revolution, and
   starting from the etching, said etching tool is driven relative to said immobilizing system such that said axis of revolution is positioned orthogonally to the plane which is tangential to said optical face and which passes through the initial point of contact between said point and said optical face.

4. The machining method as claimed in claim 1, wherein said trimming machine has a chassis with respect to which said immobilizing system is mounted to pivot with a first pivoting mobility and with respect to which a finishing arm is mounted to pivot with two other pivoting mobilities, the finishing arm carrying said etching tool, and
   during the etching, said etching tool is kept fixed in terms of rotation with respect to said finishing arm.

5. The machining method as claimed in claim 1, wherein said etching tool is equipped with a strain gage configured to measure a stress relating to the force exerted by the etching tool on the optical lens, and during the etching, said stress is acquired and said etching tool is driven relative to said immobilizing system as a function of the stress acquired.

6. The machining method as claimed in claim 1, wherein said etching tool comprises a sheath in which a mount for said point is mounted to be able to move in translation, and a return system configured to return said mount into the position extended out of the sheath, during the etching, and wherein said etching tool is driven relative to said immobilizing system such that said point is pressed theoretically into the optical lens to a setpoint depth determined as a function at least of the material of the optical lens.

7. The machining method as claimed in claim 1, wherein, during the defining the etching instructions, automatically positioning said line inside said suitable zone.

8. The machining method as claimed in claim 1, wherein, during the defining the etching instructions, manually positioning said line inside the desired outline.

9. The machining method as claimed in claim 1, wherein said optical face of the optical lens has a surface coating, and said line is situated in a temporal or nasal zone of said optical face and forms a surface portion that is free of the coating.

10. The machining method as claimed in claim 1, wherein coloring the obtained scratch, during which a marker of said trimming machine is driven relative to said immobilizing system such that the marker slides inside said scratch.

11. The machining method as claimed in claim 1, wherein said line forms a tracking code for the optical lens.

12. A machine for trimming an optical lens, the machine comprising:

an immobilizing system configured to immobilize the optical lens;

a first acquisition system configured to acquire geometric characteristics relating to the shape of at least one of the optical faces of the optical lens immobilized in said immobilizing system;

a second acquisition system configured to acquire trimming instructions for the optical lens;

a trimming tool configured to trim the optical lens;

a driving device configured to drive said trimming tool relative to said immobilizing system according to said trimming instructions;

an etching tool which comprises an abrasive point configured to score said optical face of said optical lens, wherein said second acquisition system is configured to acquire etching instructions for said optical face of the optical lens, and wherein said driving device is configured to drive said etching tool relative to said immobilizing system according to said etching instructions such that said point slides on said optical face in order to scratch the optical face.

13. The trimming machine as claimed in claim 12, wherein said etching tool comprises a nonabrasive mount, at the end of which said point is fixed, which is made of a different material than the material of said point, and wherein said point extends along a length of less than 5 millimeters.

14. The trimming machine as claimed in claim 12, further comprising a chassis with respect to which said immobilizing system is mounted to pivot with a first pivoting mobility and with respect to which a finishing arm is mounted to pivot with two other pivoting mobilities, and wherein the finishing arm carries said etching tool.

15. The trimming machine as claimed in claim 14, wherein the finishing arm carries at least one other tool chosen from the following list: a mini polishing wheel, a mini chamfering wheel, a milling cutter, and a drill bit.

16. The trimming machine as claimed in claim 14, wherein the mount for the etching tool is mounted on the finishing arm in a fixed manner in terms of rotation.

17. The trimming machine as claimed in claim 14, wherein the finishing arm carries a rotary chuck for a drill bit, and wherein the mount for the etching tool has a gripping part mounted removably in said rotary chuck.

18. The trimming machine as claimed in claim 14, wherein the first acquisition system comprises at least one sensor which is configured to come into contact with said optical face of the optical lens, which is mounted to move in translation with another translational mobility with respect to said chassis, and which carries a marker.

19. The trimming machine as claimed in claim 12, further comprising a chassis with respect to which said immobilizing system is mounted to pivot with a first pivoting mobility, wherein the first acquisition system comprises at least one sensor which is configured to come into contact with said optical face of the optical lens, which is mounted to move in translation with another translational mobility with respect to said chassis, and which carries said etching tool.

20. The trimming machine as claimed in claim 12, wherein said etching tool is equipped with a strain gage configured to measure a stress relating to the force exerted by the etching tool on the optical lens.

21. The trimming machine as claimed in claim 12, wherein the mount for the etching tool is mounted to be able to move in translation in a sheath, and a return system configure to return said mount into the position extended out of the sheath.

22. A method for machining an optical lens to be engaged in a frame by a trimming machine, the method comprising:

immobilizing the optical lens on an immobilizing system of said trimming machine;

acquiring geometric characteristics relating to the shape of at least one of the optical faces of the optical lens;

defining trimming instructions for the optical lens as a function of the acquired geometric characteristics; and trimming the optical lens around a desired outline, during which a trimming tool of the trimming machine is driven relative to said immobilizing system according to said trimming instructions;

defining etching instructions for said optical face of the optical lens as a function of the acquired geometric characteristics acquired by acquiring the shape and the position of at least one interference zone comprising at least the zone of contact between said optical face and said immobilizing system, and the zones for attaching the bridge and the temple of the spectacle frame or the surrounding zone of the rim of the spectacle frame, and identifying, inside the desired outline, at least one suitable zone in which the line can be etched, taking the shape and the position of each interference zone into account; and etching said optical face of the optical lens along a line situated inside said desired outline, during which a sharp etching tool of said trimming machine is driven relative to the immobilizing system according to said etching instructions such that a point of the etching tool slides continuously on said optical face to scratch the optical face along said line.

* * * * *